United States Patent
Vosoughi et al.

(10) Patent No.: US 11,004,237 B2
(45) Date of Patent: May 11, 2021

(54) PALETTE CODING FOR COLOR COMPRESSION OF POINT CLOUDS

(71) Applicant: Sony Corporation, Tokyo (JP)

(72) Inventors: Arash Vosoughi, San Jose, CA (US); Ali Tabatabai, Cupertino, CA (US)

(73) Assignee: Sony Group Corporation, Tokyo (JP)

( * ) Notice: Subject to any disclaimer, the term of this patent is extended or adjusted under 35 U.S.C. 154(b) by 148 days.

(21) Appl. No.: 16/107,619

(22) Filed: Aug. 21, 2018

(65) Prior Publication Data
US 2019/0114805 A1 Apr. 18, 2019

Related U.S. Application Data

(60) Provisional application No. 62/571,455, filed on Oct. 12, 2017.

(51) Int. Cl.
| | |
|---|---|
| G06T 9/00 | (2006.01) |
| G06T 7/90 | (2017.01) |
| G06K 9/62 | (2006.01) |
| G06T 11/00 | (2006.01) |

(52) U.S. Cl.
CPC .............. *G06T 7/90* (2017.01); *G06K 9/6223* (2013.01); *G06K 9/6248* (2013.01); *G06T 9/00* (2013.01); *G06T 9/001* (2013.01); *G06T 11/001* (2013.01); *G06T 2207/10028* (2013.01)

(58) Field of Classification Search
CPC .. G06T 7/90; G06T 9/00; G06T 9/001; G06T 11/001; G06T 2207/10028; G06K 9/6223; G06K 9/6248
See application file for complete search history.

(56) References Cited

U.S. PATENT DOCUMENTS

| | | | |
|---|---|---|---|
| 2002/0080153 A1* | 6/2002 | Zhao | H04N 1/644 715/700 |
| 2004/0217956 A1* | 11/2004 | Besl | G06T 15/205 345/419 |
| 2006/0204086 A1* | 9/2006 | Gargi | H04N 1/644 382/166 |
| 2015/0278214 A1* | 10/2015 | Anand | G06F 16/338 707/748 |
| 2015/0281703 A1* | 10/2015 | Zou | H04N 19/94 375/240.24 |
| 2017/0094262 A1* | 3/2017 | Peterson | H04N 21/854 |
| 2017/0150153 A1* | 5/2017 | Barroux | H04N 19/105 |
| 2018/0189982 A1* | 7/2018 | Laroche | G06T 9/001 |
| 2019/0114805 A1* | 4/2019 | Vosoughi | G06K 9/6248 |

(Continued)

OTHER PUBLICATIONS

Dado et al "Geometry and Attribute Compression for Voxel Scenes" Eurographics 2016.*

(Continued)

*Primary Examiner* — Sean T Motsinger
(74) *Attorney, Agent, or Firm* — Haverstock & Owens LLP

(57) ABSTRACT

A method of compression of the color data of point clouds is described herein. A palette of colors that best represent the colors existing in the cloud is generated. Clustering is utilized for generating the palette. Once the palette is generated, an index to the palette is found for each point in the cloud. The indexes are coded using an entropy coder afterwards. A decoding process is then able to be used to reconstruct the point clouds.

11 Claims, 11 Drawing Sheets

(56) References Cited

U.S. PATENT DOCUMENTS

2019/0114808 A1* 4/2019 Vosoughi .................. G06T 9/40

OTHER PUBLICATIONS

Xin Li, "Embedded Coding of Palette Images in the Topological Space", proceedings of the Data Compression Conference (DCC'02).
Li Cui, "Hybrid Color Attribute Compression for Point Cloud Data", Proceedings of the IEEE International Conference on Multimedia and Expo (ICME)2017, Jul. 2017, pp. 1273-1278.

* cited by examiner

PALETTE CODING FOR COLOR COMPRESSION OF POINT CLOUDS

CROSS-REFERENCE TO RELATED APPLICATION(S)

This application claims priority under 35 U.S.C. § 119(e) of the U.S. Provisional Patent Application Ser. No. 62/571,455, filed Oct. 12, 2017 and titled, "PALETTE CODING FOR COLOR COMPRESSION OF POINT CLOUDS," which is hereby incorporated by reference in its entirety for all purposes.

FIELD OF THE INVENTION

The present invention relates to data compression. More specifically, the present invention relates to point cloud compression.

BACKGROUND OF THE INVENTION

Point clouds are huge data sets of three dimensional points including information such as color and distance. The point clouds are able to be acquired frequently such as when using Light Detection And Ranging (LIDAR) on a moving vehicle which repeatedly acquires point clouds. Compressing the vast amount of point cloud data is important to enable practical processing of the data.

SUMMARY OF THE INVENTION

A method of compression of the color data of point clouds is described herein. A palette of colors that best represent the colors existing in the cloud is generated. Clustering is utilized for generating the palette. Once the palette is generated, an index to the palette is found for each point in the cloud. The indexes are coded using an entropy coder afterwards. A decoding process is then able to be used to reconstruct the point clouds.

In one aspect, a method comprises generating a matrix from a point cloud, generating a palette based on the matrix, writing the palette to a bit stream, deriving an index for each point in the matrix, entropy coding the indexes and writing the encoded indexes to the bit stream. The matrix contains rgb components of pixels from the point cloud. The matrix is size K, and the index is from 1 to K. Deriving the index utilizes a Euclidean distance. The Euclidean distance of the color of a point is computed against all colors in the palette, and a palette color that has a minimum distance is a best representation for the palette color of the point. Generating the palette utilizes K-clustering. The method further comprises decoding the encoded indexes and the palette to re-generate the point cloud.

In another aspect, an apparatus comprises a non-transitory memory for storing an application, the application for: generating a matrix from a point cloud, generating a palette based on the matrix, writing the palette to a bit stream, deriving an index for each point in the matrix, entropy coding the indexes and writing the encoded indexes to the bit stream and a processor coupled to the memory, the processor configured for processing the application. The matrix contains rgb components of pixels from the point cloud. The matrix is size K, and the index is from 1 to K. Deriving the index utilizes a Euclidean distance. The Euclidean distance of the color of a point is computed against all colors in the palette, and a palette color that has a minimum distance is a best representation for the palette color of the point. Generating the palette utilizes K-clustering. The apparatus further comprises decoding the encoded indexes and the palette to re-generate the point cloud.

In another aspect, a system comprises a first computing device configured for: generating a matrix from a point cloud, generating a palette based on the matrix, writing the palette to a bit stream, deriving an index for each point in the matrix, entropy coding the indexes and writing the encoded indexes to the bit stream and a second computing device configured for: decoding the encoded indexes and the palette to re-generate the point cloud. The matrix contains rgb components of pixels from the point cloud. The matrix is size K, and the index is from 1 to K. Deriving the index utilizes a Euclidean distance. The Euclidean distance of the color of a point is computed against all colors in the palette, and a palette color that has a minimum distance is a best representation for the palette color of the point. Generating the palette utilizes K-clustering.

DETAILED DESCRIPTION OF THE PREFERRED EMBODIMENT

A method for compression of the color data of point clouds is described herein. A palette of colors that best represent the colors existing in the cloud is generated. Clustering is utilized for generating the palette. Once the palette is generated, an index to the palette is found for each point in the cloud using the minimum Euclidean distance criterion (or other criteria). The indexes are coded using an entropy coder afterwards.

The results show that the proposed color coding method can outperform the Anchor by up to 7 dB at the same bit rate. A big advantage of the algorithm is the visual quality of its decoded cloud compared to that of Anchor. The algorithm provides a more visually satisfying cloud with very smooth color variations, while the Anchor's results generally suffer from distortions due to JPEG's transform quantization as well as color leaking.

Figure 1:
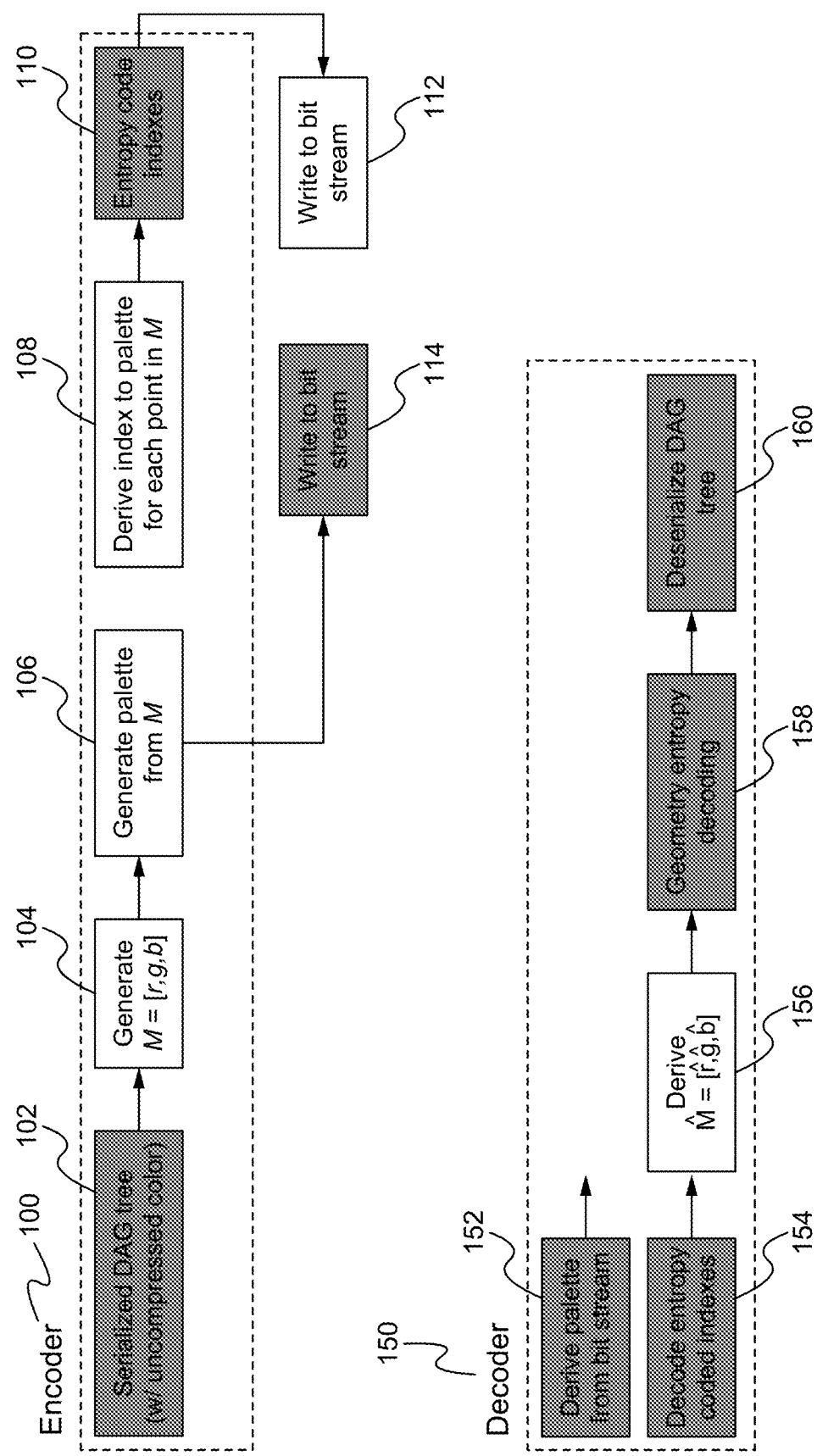
FIG. 1 illustrates a flowchart of a palette coding encoder and decoder according to some embodiments.
Figure 2A:
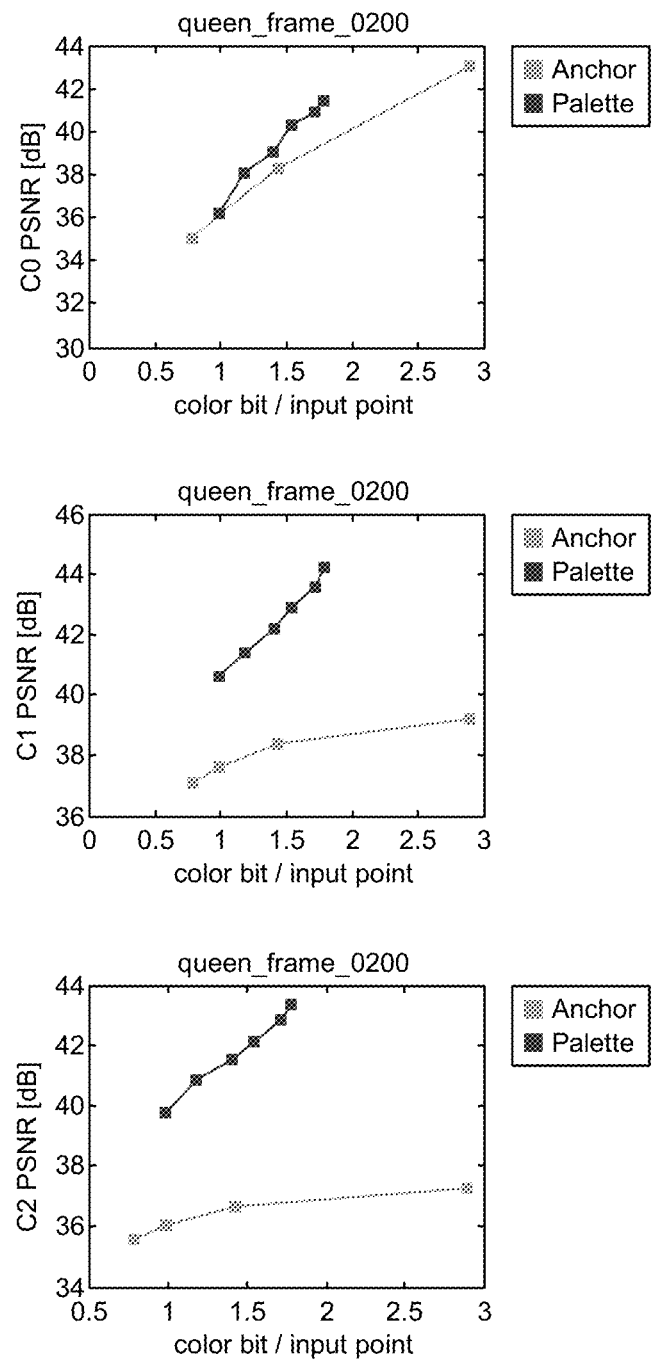
FIGS. 2A-E illustrate RD curves of the palette coding algorithm and the Anchor according to some embodiments.
Figure 2B:
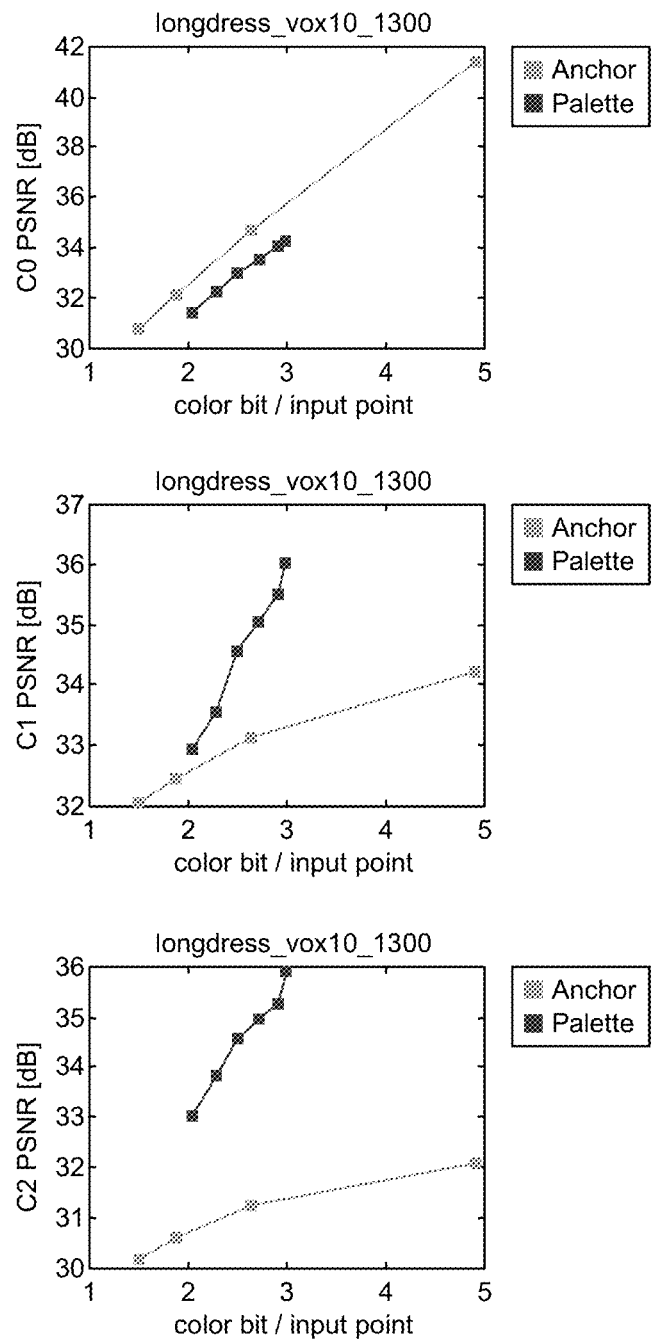
Figure 2C:
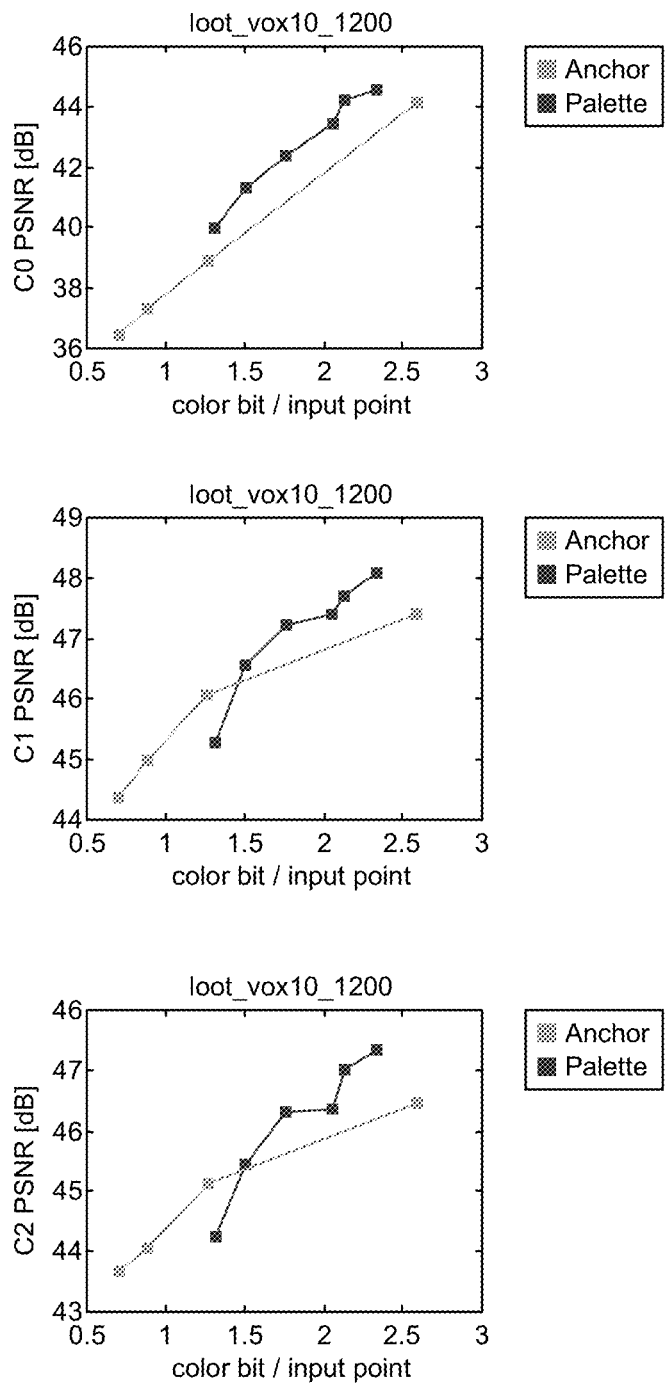
Figure 2D:
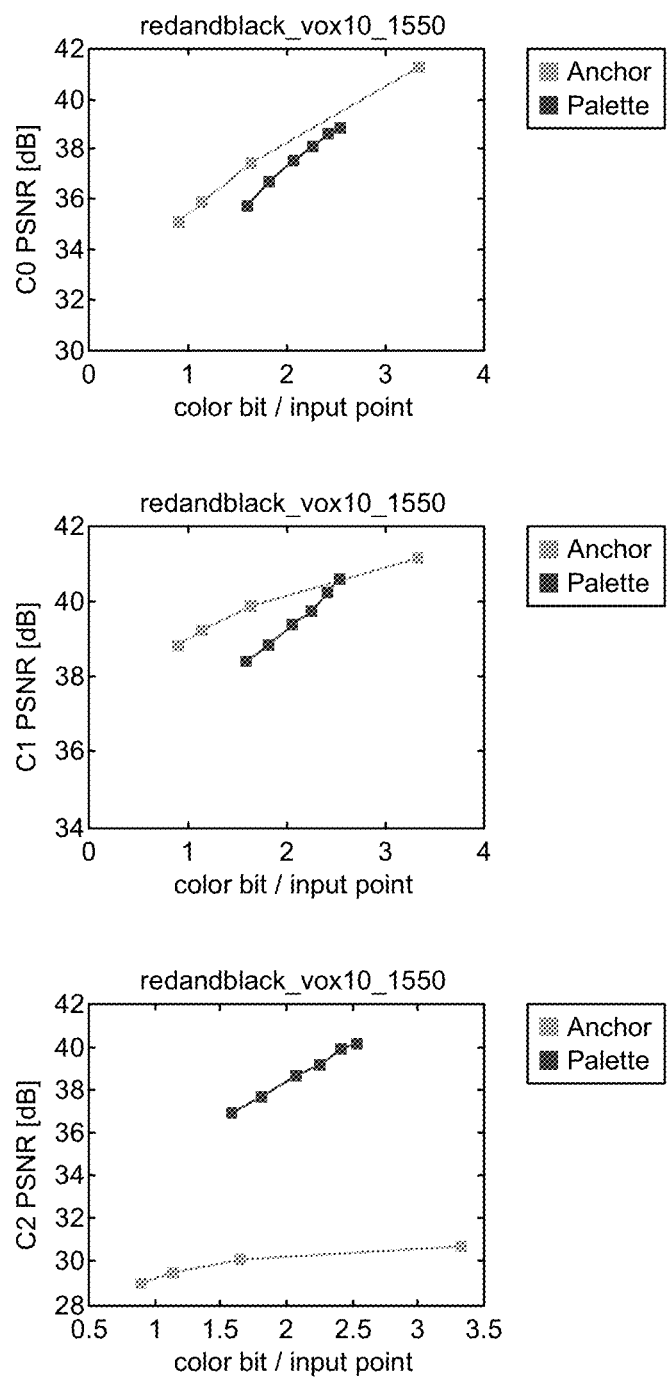
Figure 2E:
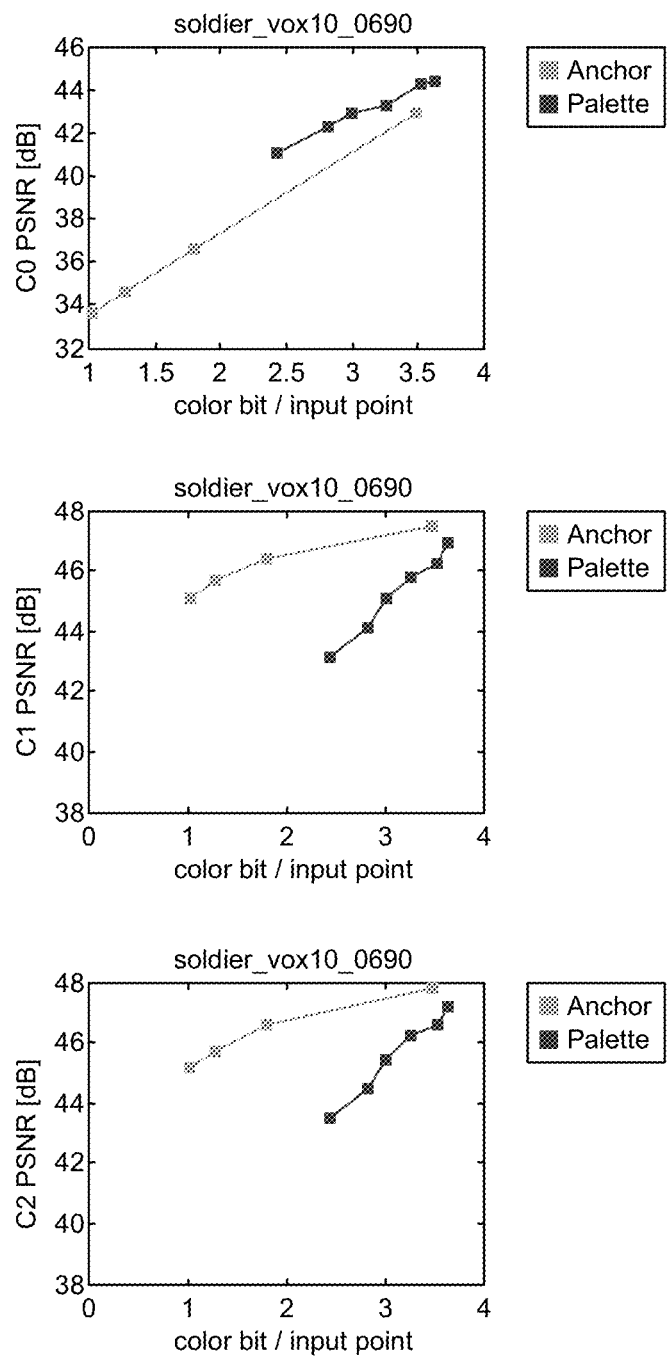

FIG. 1 illustrates a flowchart of a palette coding encoder and decoder according to some embodiments. An encoder 100 is utilized to implement the palette coding for color compression. In the step 102, a serialized Directed Acyclic Graph (DAG) tree with uncompressed color of a cloud point is received/acquired/generated. In the step 104, a Matrix M is generated. The Matrix M contains rgb components of pixels from the point cloud. In the step 106, a palette is generated from the Matrix M. The palette has a size K. The palette is written to the bit stream in the step 114. In the step 108, an index to the palette is derived for each point in Matrix M. In some embodiments, the indexes are assigned using a similarity measure (e.g., Euclidean distance). In the step 110, the indexes are entropy coded. Instead of coding an RGB value for each point, an index is coded which refers to a particular color in the palette. In the step 112, the encoded indexes are written to the bit stream. In some embodiments, fewer or additional steps are implemented. In some embodiments, the order of the steps is modified.

A decoder 150 is utilized to implement decoding the encoded content (e.g., palette and indexes). In the step 152, a palette is derived from the bit stream. In the step 154, the entropy coded indexes are decoded. In the step 156, $\hat{M}=[\hat{r}, \hat{g}, \hat{b}]$ is derived using the derived palette and the decoded entropy coded indexes. In the step 158, geometry entropy decoding is implemented to decode the geometry encoding. In the step 160, a DAG tree is deserialized. In some embodiments, fewer or additional steps are implemented. In some embodiments, the order of the steps is modified.

The idea is to find a palette of colors with size K, which best represents the serialized color obtained after the geometry coding. This implies that the proposed palette color coding works for both cases of lossless and lossy geometry. Each color in the palette is represented with a unique identifier (e.g., index) ranging from 1 to K. Assuming a palette, each point of the serialized data is assigned a color from the palette. This implies that instead of coding an RGB value for each point, an index is coded which refers to a particular color in the palette.

Index assignment is able to be done using any similarity measure (e.g., Euclidean distance). The Euclidean distance of the color of a point is computed against all the colors in the palette. A palette color that has the minimum distance is the best representation for the color of that point, and its index is determined. Indexes for all the points are derived. A stream is generated of the indexes. The stream of indexes is then entropy coded and written into the bit stream. The palette is also sent as metadata.

To generate the palette, K-means clustering is utilized, which groups colors into clusters. The input of K-means clustering is an N×3 matrix, where N is the number of points, and each row contains the RGB values of one point. To generate a palette of size K, the number of clusters is set to K which yields a palette of K colors. In some embodiments, a Partial Prediction Matching Data (PPMD) tool of 7zip entropy coder is used for entropy coding of the stream of indexes.

At the encoder, palette coding is done right after the geometry coding. At the decoder, palette decoding is able to be done in parallel with the geometry coding. Having the palette available at decoder, the color of each point is simply derived the palette using its decoded index.

Results

RD curves of the palette coding algorithm and the Anchor are depicted in FIGS. 2A-E. Geometry coding is exactly the same for both the Anchor and the palette coding approach. The difference is in color coding, where Anchor uses JPEG for color compression, while palette coding (followed by entropy coding) is used in the palette coding method. Significant gains over Anchor are observed for the "queen" sequence, which is a Computer Graphic (CG) point cloud. This implies that the algorithm has a great potential in compression of CG clouds.

Figure 3:
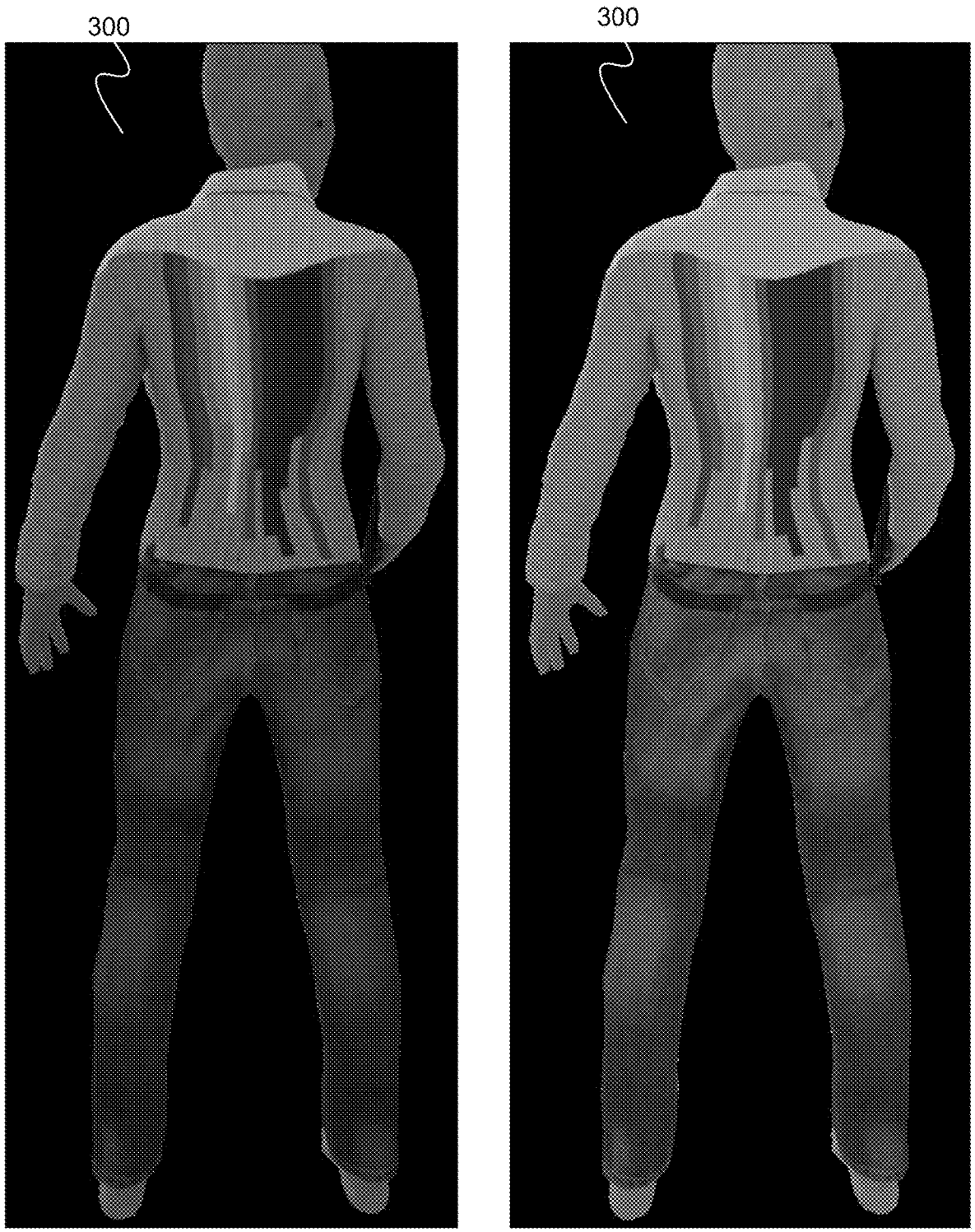
FIGS. 3 and 4 illustrate comparisons of the visual quality of the reconstructed/decoded clouds according to some embodiments.
Figure 4:

Another advantage of the algorithm is the visual quality of its decoded cloud compared to that of Anchor. FIGS. 3 and 4 compare the visual quality of the reconstructed data. The two cases in the Figures are: (1) Anchor PCC with JPEG quality parameter of 85 (FIG. 3 300, FIGS. 4 400), and (2) the palette coding algorithm with palette size of 40 (FIG. 3, 302, FIG. 4, 402). These two cases roughly correspond to the same bit rate. The output of Anchor severely suffers from distortion due to JPEG transform quantization as well as color leaking, while the proposed algorithm provides a decoded cloud with very smooth color variations. Also, transform quantization distortion and color leaking are observed at the output of the Anchor, while the output of the proposed algorithm looks very smooth and more visually satisfying.

Figure 5:
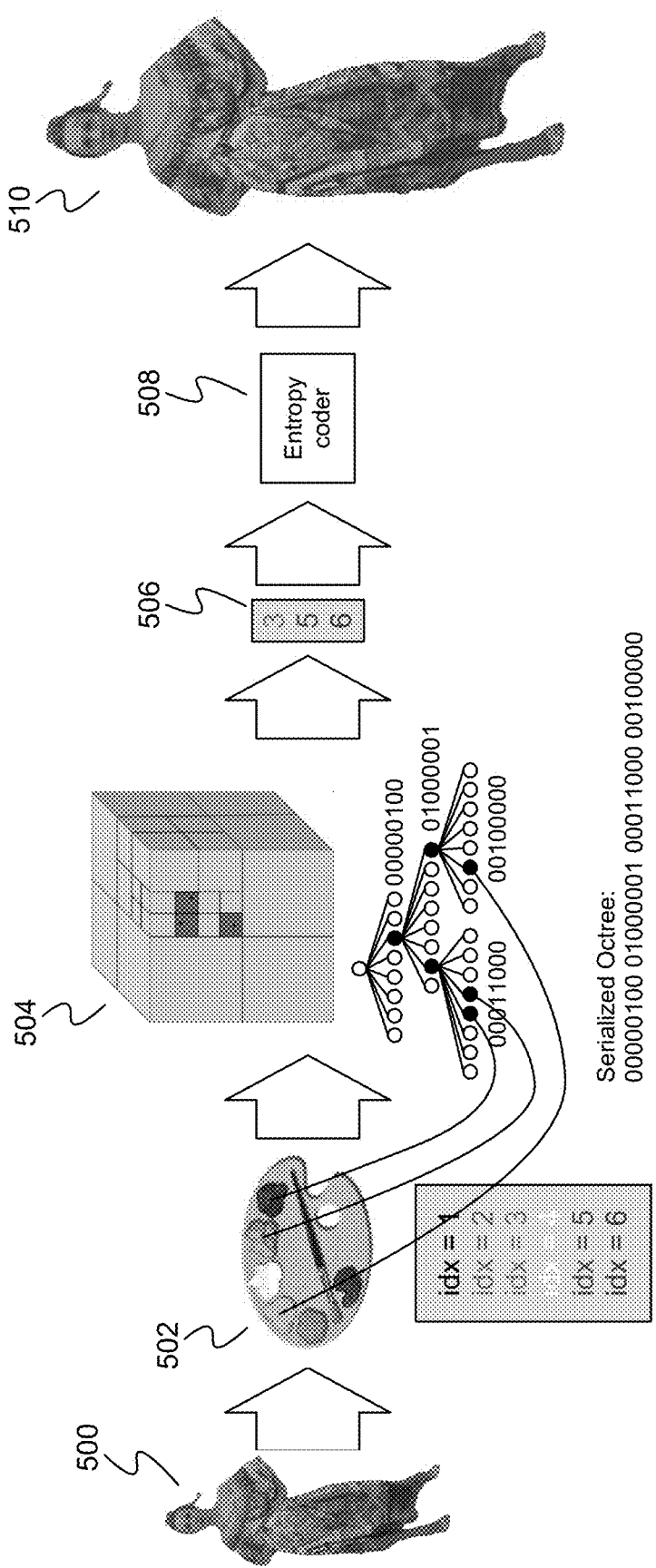
FIG. 5 illustrates a diagram of palette coding for color compression according to some embodiments.

FIG. 5 illustrates a diagram of palette coding for color compression according to some embodiments. A point cloud is acquired or received, in the step 500. A palette of colors (e.g., 10 color palette) is derived using clustering, in the step 502. Then, a serialized Octree is generated, in the step 504. The serialized Octree includes select colors from the palette. From the serialized Octree, indexes to the palette are derived for each point, in the step 506. Then, the indexes are entropy coded, in the step 508, to generate an encoded point cloud 510.

Figure 6:
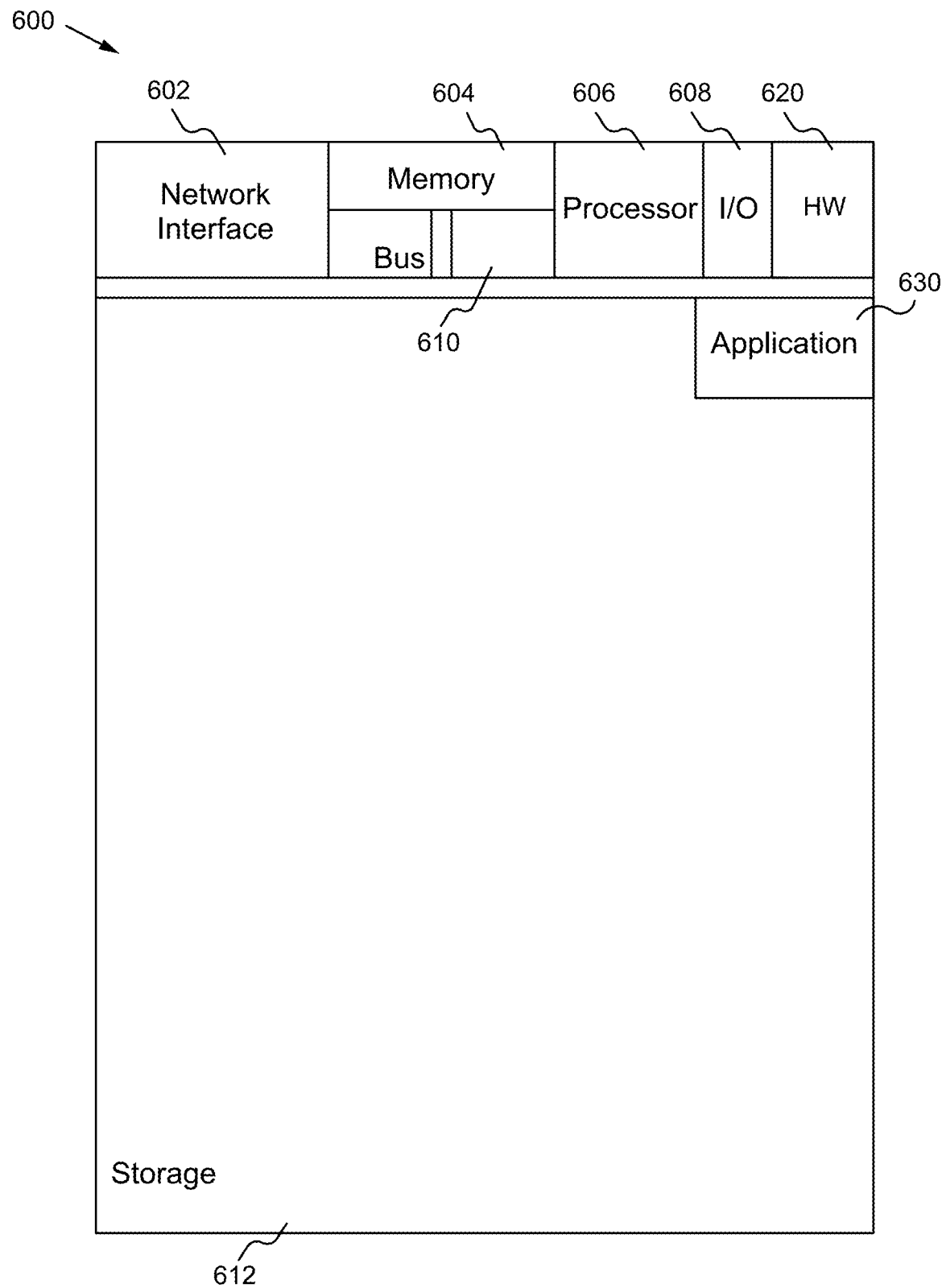
FIG. 6 illustrates a block diagram of an exemplary computing device configured to implement the palette coding for color compression method according to some embodiments.

FIG. 6 illustrates a block diagram of an exemplary computing device configured to implement the palette coding for color compression method according to some embodiments. The computing device 600 is able to be used to acquire, store, compute, process, communicate and/or display information such as images and videos. The computing device 600 is able to implement any of the palette coding for color compression aspects such as encoding and/or decoding. In general, a hardware structure suitable for implementing the computing device 600 includes a network interface 602, a memory 604, a processor 606, I/O device(s) 608, a bus 610 and a storage device 612. The choice of processor is not critical as long as a suitable processor with sufficient speed is chosen. The memory 604 is able to be any conventional computer memory known in the art. The storage device 612 is able to include a hard drive, CDROM, CDRW, DVD, DVDRW, High Definition disc/drive, ultra-HD drive, flash memory card or any other storage device. The computing device 600 is able to include one or more network interfaces 602. An example of a network interface includes a network card connected to an Ethernet or other type of LAN. The I/O device(s) 608 are able to include one or more of the following: keyboard, mouse, monitor, screen, printer, modem, touchscreen, button interface and other devices. Palette coding for color compression application(s) 630 used to implement the palette coding for color compression method are likely to be stored in the storage device 612 and memory 604 and processed as applications are typically processed. More or fewer components shown in FIG. 6 are able to be included in the computing device 600. In some embodiments, palette coding for color compression hardware 620 is included. Although the computing device 600 in FIG. 6 includes applications 630 and hardware 620 for the palette coding for color compression method, the palette coding for color compression method is able to be implemented on a computing device in hardware, firmware, software or any combination thereof. For example, in some embodiments, the palette coding for color compression applications 630 are programmed in a memory and executed using a processor. In another example, in some embodiments, the palette coding for color compression hardware 620 is programmed hardware logic including gates specifically designed to implement the palette coding for color compression method.

In some embodiments, the palette coding for color compression application(s) 630 include several applications and/or modules. In some embodiments, modules include one or more sub-modules as well. In some embodiments, fewer or additional modules are able to be included.

In some embodiments, the palette coding for color compression hardware 620 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

Figure 7:
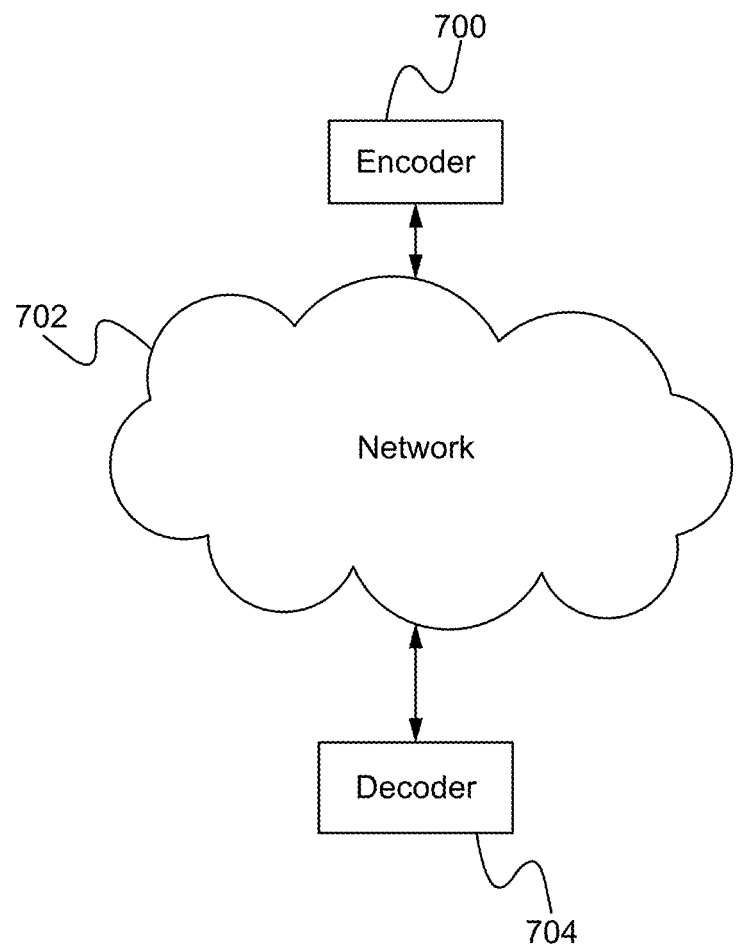
FIG. 7 illustrates a diagram of a network of devices according to some embodiments.

FIG. 7 illustrates a diagram of a network of devices according to some embodiments. Video content is encoded at one or more encoder devices 700. The encoded content is transmitted/streamed through a network 702 (e.g., the Internet, a cellular network or any other network) to one or more decoder devices 704. In some embodiments, the content is transmitted to the one or more decoder devices 704 directly without a network. The one or more devices of the network of devices (e.g., encoder device, decoder device) are configured to perform the palette coding for color compression implementation described herein. The one or more encoder devices 700 and the one or more decoder devices 704 are able to be any device such as servers, a personal computers, smart phones, televisions, gaming systems, vehicles or any of the devices described herein or any combination of devices described herein.

To utilize palette coding for color compression described herein, devices such as digital cameras/camcorders are used to acquire content. The palette coding for color compression is able to be implemented with user assistance or automatically without user involvement to efficiently encode, transmit, and decode the content.

In operation, the palette coding for color compression avoids significant color leaking and other issues. The results show that much better compression is achieved with palette coding for color compression compared to the Anchor.

Some Embodiments of Palette Coding for Color Compression of Point Clouds

1. A method comprising:
    generating a matrix from a point cloud;
    generating a palette based on the matrix;
    writing the palette to a bit stream;
    deriving an index for each point in the matrix;
    entropy coding the indexes; and
    writing the encoded indexes to the bit stream.
2. The method of clause 1 wherein the matrix contains rgb components of pixels from the point cloud.
3. The method of clause 1 wherein the matrix is size K, and the index is from 1 to K.
4. The method of clause 1 wherein deriving the index utilizes a Euclidean distance.
5. The method of clause 4 wherein the Euclidean distance of the color of a point is computed against all colors in the palette, and a palette color that has a minimum distance is a best representation for the palette color of the point.
6. The method of clause 1 wherein generating the palette utilizes K-clustering.
7. The method of clause 1 further comprising decoding the encoded indexes and the palette to re-generate the point cloud.
8. An apparatus comprising:
    a non-transitory memory for storing an application, the application for:
        generating a matrix from a point cloud;
        generating a palette based on the matrix;
        writing the palette to a bit stream;
        deriving an index for each point in the matrix;
        entropy coding the indexes; and
        writing the encoded indexes to the bit stream; and
    a processor coupled to the memory, the processor configured for processing the application.
9. The apparatus of clause 8 wherein the matrix contains rgb components of pixels from the point cloud.
10. The apparatus of clause 8 wherein the matrix is size K, and the index is from 1 to K.
11. The apparatus of clause 8 wherein deriving the index utilizes a Euclidean distance.
12. The apparatus of clause 11 wherein the Euclidean distance of the color of a point is computed against all colors in the palette, and a palette color that has a minimum distance is a best representation for the palette color of the point.
13. The apparatus of clause 8 wherein generating the palette utilizes K-clustering.
14. The apparatus of clause 8 further comprising decoding the encoded indexes and the palette to re-generate the point cloud.
15. A system comprising:
    a first computing device configured for:
        generating a matrix from a point cloud;
        generating a palette based on the matrix;
        writing the palette to a bit stream;
        deriving an index for each point in the matrix;
        entropy coding the indexes; and
        writing the encoded indexes to the bit stream; and
    a second computing device configured for:
        decoding the encoded indexes and the palette to re-generate the point cloud.
16. The system of clause 15 wherein the matrix contains rgb components of pixels from the point cloud.
17. The system of clause 15 wherein the matrix is size K, and the index is from 1 to K.
18. The system of clause 15 wherein deriving the index utilizes a Euclidean distance.
19. The system of clause 18 wherein the Euclidean distance of the color of a point is computed against all colors in the palette, and a palette color that has a minimum distance is a best representation for the palette color of the point.
20. The system of clause 15 wherein generating the palette utilizes K-clustering.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method comprising:
    generating a matrix from a point cloud;

generating a palette based on the matrix utilizing K-means clustering, wherein input of the K-means clustering is an N×3 matrix, where N is a number of points, and each row contains RGB values of a point;
writing the palette to a bit stream;
deriving an index for each point in the matrix, wherein deriving the index utilizes a Euclidean distance, wherein the Euclidean distance of the color of a point is computed against all colors in the palette, and a palette color that has a minimum distance is a best representation for the palette color of the point;
entropy coding a stream of the indexes using a partial prediction matching data tool; and
writing the encoded indexes to the bit stream.

2. The method of claim 1 wherein the matrix contains rgb components of pixels from the point cloud.

3. The method of claim 1 wherein the matrix is size K, and the index is from 1 to K.

4. The method of claim 1 further comprising decoding the encoded indexes and the palette to re-generate the point cloud.

5. An apparatus comprising:
a non-transitory memory for storing an application, the application for:
  generating a matrix from a point cloud;
  generating a palette based on the matrix utilizing K-means clustering, wherein input of the K-means clustering is an N×3 matrix, where N is a number of points, and each row contains RGB values of a point;
  writing the palette to a bit stream;
  deriving an index for each point in the matrix, wherein deriving the index utilizes a Euclidean distance, wherein the Euclidean distance of the color of a point is computed against all colors in the palette, and a palette color that has a minimum distance is a best representation for the palette color of the point;
  entropy coding a stream of the indexes using a partial prediction matching data tool; and
  writing the encoded indexes to the bit stream; and
a processor coupled to the memory, the processor configured for processing the application.

6. The apparatus of claim 5 wherein the matrix contains rgb components of pixels from the point cloud.

7. The apparatus of claim 5 wherein the matrix is size K, and the index is from 1 to K.

8. The apparatus of claim 5 further comprising decoding the encoded indexes and the palette to re-generate the point cloud.

9. A system comprising:
a first computing device configured for:
  generating a matrix from a point cloud;
  generating a palette based on the matrix utilizing K-means clustering, wherein input of the K-means clustering is an N×3 matrix, where N is a number of points, and each row contains RGB values of a point;
  writing the palette to a bit stream;
  deriving an index for each point in the matrix, wherein deriving the index utilizes a Euclidean distance, wherein the Euclidean distance of the color of a point is computed against all colors in the palette, and a palette color that has a minimum distance is a best representation for the palette color of the point;
  entropy coding a stream of the indexes using a partial prediction matching data tool; and
  writing the encoded indexes to the bit stream; and
a second computing device configured for:
  decoding the encoded indexes and the palette to re-generate the point cloud.

10. The system of claim 9 wherein the matrix contains rgb components of pixels from the point cloud.

11. The system of claim 9 wherein the matrix is size K, and the index is from 1 to K.

* * * * *